United States Patent

[11] 3,577,842

| [72] | Inventors | Miyoji Nakai<br>Neyagawa-shi;<br>Akira Nakajima, Hirakata-shi; Makoto Watanabe, Osaka; Toshio Sanukiya, Izumisano-shi, Japan |
|---|---|---|
| [21] | Appl. No. | 838,486 |
| [22] | Filed | July 2, 1969 |
| [45] | Patented | May 11, 1971 |
| [73] | Assignee | Matsushita Electric Industrial Co., Ltd. Osaka, Japan |
| [32] | Priority | July 4, 1968 |
| [33] | | Japan |
| [31] | | 43/47682 |

[54] APPARATUS FOR COMPRESSION MOLDING A POWDER WITHIN A CONTAINER
4 Claims, 12 Drawing Figs.

[52] U.S. Cl. .................................... 18/20, 18/5, 18/16, 18/36
[51] Int. Cl. .................................... B29c 3/00, B30b 11/10
[50] Field of Search .................................... 18/5 (R), 5 (RR), 16 (R), 16 (F), 16.5, 36, 20 (C), 20 (P)

[56] References Cited
UNITED STATES PATENTS

| 2,710,988 | 6/1955 | Willcox et al. | 18/16 |
| 3,156,749 | 11/1964 | Hosfield | 18/16X |
| 3,175,521 | 3/1965 | Hesshberg | 18/16.5X |
| 3,189,942 | 6/1965 | Rapprich et al. | 18/16 |
| 3,198,862 | 8/1965 | Amthor et al. | 18/16UX |
| 3,329,753 | 7/1967 | Saurwein | 18/5X |
| 3,384,007 | 5/1968 | Boje et al. | 18/16X |

*Primary Examiner*—J. Howard Flint, Jr.
*Attorney*—Stevens, Davis, Miller & Mosher ABSTRACT: An apparatus for compression molding a powder within a container, which is operative in such a manner that empty containers successively loaded on an intermittently driven rotary member at a loading station of the apparatus with its open end facing downwardly are carried one after another to a molding station where a compression-moldable powder previously charged in a cavity die from a hopper is displaced into and compression molded within said container into a prescribed shape by a relative movement of said container which is held immovably, and a core die and a sleeve surrounding said core die, and upon completion of the compression molding said container is further carried by said rotary member to an unloading station with the shaped mold of said powder formed therein where it is removed from the rotary member.

Patented May 11, 1971

M. NAKAI, A. NAKAJIMA,
M. WATANABE AND
T. SANUKIYA
INVENTOR

BY Stevens, Davis, Miller & Mosher
ATTORNEY

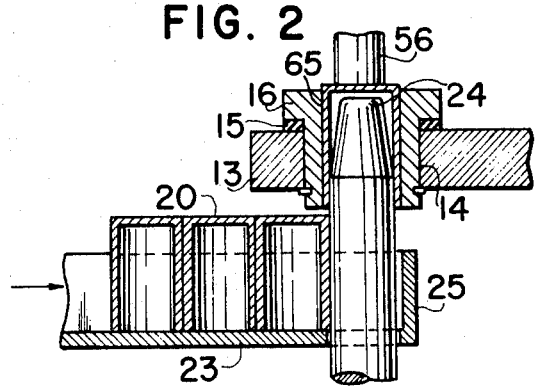
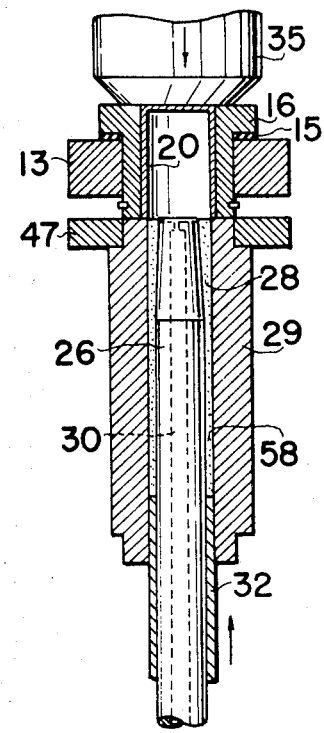
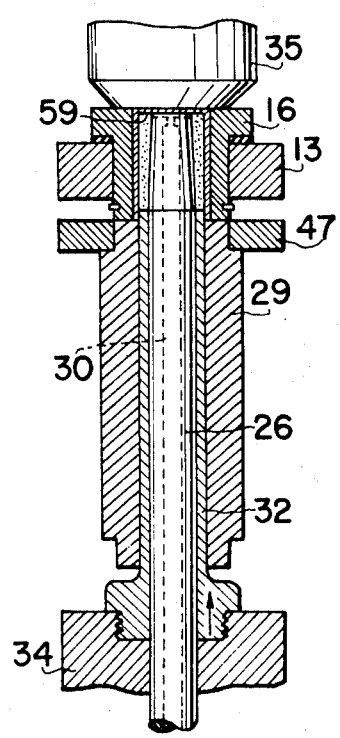

Patented May 11, 1971

APPARATUS FOR COMPRESSION MOLDING A POWDER WITHIN A CONTAINER

The present invention relates to an apparatus for the compression molding of a powder within a container, and more particularly relates to an apparatus for compression molding a depolarizing mixture, i.e. a mixed powder of a depolarizer, of cells or the like into a prescribed shape within the casing of the cell.

In describing a prior art method with reference to the production process of a cell, particularly an alkaline manganese cell or mercury cell, the positive electrode unit of the cell has been produced by previously molding a depolarizing mixture into the shape of a short cylindrical body independently of a container and forcibly fitting three or four of the thus shaped depolarizing mixture molds into the container. Such prior art method, however, had various defects as set forth below and was very disadvantageous from the production point of view.

1. The shaped mold tends to be broken at its edge or cracked upon completion of the molding.
2. There is the danger of the edge of the shaped mold being broken during transportation.
3. The shaped mold tends to be broken at its edge when the mold is forcibly fitted into a container, while on the other hand, if an attempt is made to minimize the dimensional errors with respect to the inner and outer diameters of the container by enhancing the dimensional accuracy of the container so as to avoid such undesirable phenomenon, the production cost of the cell as a whole becomes high.
4. A tight contact between the container and the shaped molds fitted thereinto with pressure can hardly be obtained, with the result that the contact resistance between said container and said molds or the internal resistance of a cell composed of said container and said molds as depolarizer becomes large and, therefore, the discharge performance of the cell is degraded.
5. The production process becomes more complicated, with a substantial influence on the cost of production.
6. The method is not adaptable for mass production and high speed production.

Any and all of the defects set forth above results from the fact that the engagement between the container and the molds fitted therein is unsatisfactory.

The present invention contemplates the provision of an apparatus by which a powder to be molded is charged in a container and compression-molded within said container, for the purpose of obviating the above-described defects of the conventional method.

An object of the present invention is to provide an apparatus adapted to form a breakage- and crack-free shaped mold of a powder by compression-molding the powder within a container, Another object of the invention is to preclude the occurrence of a broken edge of or cracks in a shaped mold of a powder by effecting compression molding of the powder within a container, which would otherwise be encountered during transportation and/or pressure-fitting into the container of the shaped mold produced by the conventional method.

Still another object of the invention is to improve the contacting engagement between a container and a shaped mold of a powder fitted thereinto and thereby minimizing the contact resistance therebetween.

A further object of the invention is to carry out the pressure molding of a powder within a container at a high efficiency so as to provide for mass production of an objective article.

An additional object of the invention is to simplify the production process of a cell and thereby to reduce the production cost of the same when the apparatus of the invention is used for the production of cells.

According to the present invention there is provided an apparatus for effecting compression molding of a powder within a container, which comprises a rotary member having a plurality of through-holes therein and adapted to be rotated while holding in each of said through-holes a container, open at one end, with the open end facing downwardly; means for rotating said rotary member intermittently in such a manner that each of said through-holes is located at a plurality of working stations of said apparatus one after another successively; means provided at at least one of said stations and adapted to insert said container into said through-hole in the rotary member with the open end thereof facing downwardly when said through-hole is located at said at least one station; means provided at at least another one of said stations and comprising a hopper capable of reciprocatory movement in relation to the rotation of said rotary member, a cavity die having formed therein a hollow at the upper and lower ends thereof, and a core die capable of vertical reciprocatory movement within said cavity die, said last-mentioned means being operative in such a manner that when the lower open end of said cavity die has been closed by said core die, a compression-moldable powder is charged into the hollow of said cavity die from said hopper and when the container being held in said through-hole is located at said at least another one of the stations and held immovably thereat, said core die is moved upwardly in said cavity die, whereby said powder in said cavity die is stuffed into said container and compression-molded therein into a prescribed shape; and means provided at at least still another one of said stations and adapted to remove said container from said rotary member with the shaped mold of the powder therein when said container is located and held immovably at said still another one of the stations.

Other objects and advantages of the invention will be pointed out specifically or will become apparent from the following description when it is considered in conjunction with the appended claims and the accompanying drawings, in which:

FIG. 1 is an overall perspective view of an embodiment of the apparatus for compression molding a powder within a container according to the present invention, with a portion thereof broken away;

FIGS. 2 to 8 inclusive are views respectively showing in sequence the steps of the operation of compression molding a powder within a container, in the apparatus shown in FIG. 1, in which:

FIG. 2 is a view showing the step of mounting the containers on said apparatus;

FIGS. 5 and 6 are views showing the step of stuffing the powder, charged into said cavity die, into the container and compression-molding the same therein;

FIG. 8b is a plan view of the spindle shown in FIG. 8a;

FIG. 9b is a plan view of the spindle shown in FIG. 9a; and

Figure 1:
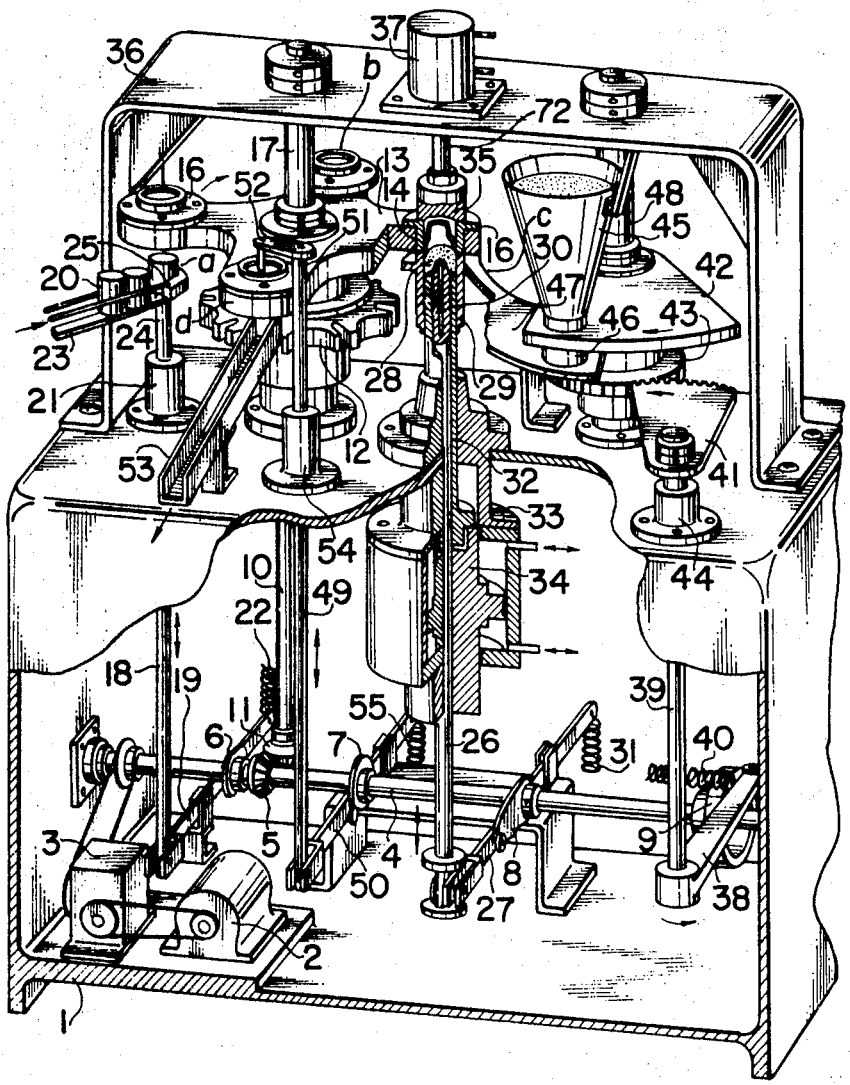

In the following description on embodiments of the present invention, reference is made, as an example, to the case wherein a mixed powder of polarizer is stuffed in a cell casing and molded therein.

A base structure 1 of a molding apparatus accommodates therein a drive motor 2, a reduction gearing 3 and a drive shaft 4, and the drive of the motor 2 is transmitted to the shaft 4 through the reduction gearing 3.

The drive shaft 4 has a bevel gear 5 and four driving cams 6, 7, 8 and 9, fixedly mounted thereon.

The bevel gear 5 is in meshing engagement with a bevel gear 11 fixedly mounted on the lower end of a shaft 10, the upper end of which is secured to a Zeneva driving member (not shown).

The Zeneva driving member intermittently rotates a Zeneva driven member 12 having eight nails and located above the base structure 1, which Zeneva driven member in turn rotates a cross-shaped rotary member 13, mounted integrally on a supporting shaft of said driven member, also intermittently.

Figure 7:
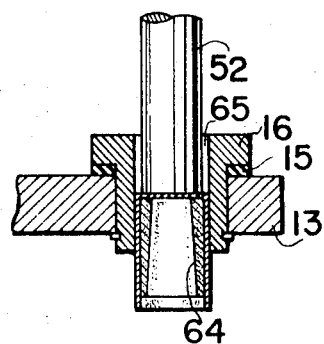
FIG. 7 is a view showing the step of removing the container from the apparatus, upon completion of molding of the powder within said container.

The cross-shaped rotary member 13 has a through-hole 14 bored in the outer end portion of each arm thereof and in each through-hole 14 is securely mounted a flanged container holder 16 through a rubber ring 15, said flanged container holder 16 having formed therein a through-hole 65 adapted for receiving and holding a cell casing 20 therein in such a manner as not to permit said cell casing to drop therethrough (FIG. 7). Reference numeral 17 designates a supporting shaft on which said rotary member 13 and said Zeneva driven member are mounted for rotation therewith.

The apparatus has four stations indicated at characters a, b, c and d in FIG. 1 and the rotary member 13 is rotated intermittently so that each of the through-holes 14 is shifted from one to another of the four stations in sequence. The arrangement of each station will be described hereunder:

The station a is the place where the cell casings or cell containers are individually loaded on the apparatus. Each cell casing 20 is forced into the casing holder 16 by the action of a spindle 18. The spindle 18 is connected at its lower end with one end of a rocking lever 19 which is rocked by the cam 6, and is moved vertically and reciprocatorily while being slidably supported by a sleeve member 21 mounted on the base structure 1. The other end of the rocking lever is connected with a spring 22 which is provided for return movement of said rocking lever. The cell casings 20 are delivered in a chute 23 to a position immediately above the top end 24 of the spindle 18 in an inverted position or with the bottom thereof facing upwardly, and are stopped in said position by a stopper 25.

At the station b, no work is performed whatsoever.

At the station c, a powder to be molded within the casing is stuffed and molded in said casing. Namely, a mixed powder polarizer 28 previously charged in a cavity die 29 is displaced into the cell casing 20 by the action of a core die-constituting spindle 26. The spindle 26 is connected at its lower end with one end of a rocking lever 27 which is rocked by the cam 8, and extends into the cavity die 29 at its upper end. When the spindle 26 is caused to move upward, its top end moves upward through the cavity die 29 and projects into the cell casing 20. The spindle 26 has a bore 30 of small diameter formed axially centrally therein for exhausting gases therethrough (FIG. 5).

The other end of the rocking lever 27 is connected with one end of a spring 31 which is provided for the return movement of said rocking lever. A movable sleeve 32 for supporting the spindle 26 is in engagement at its lower end with a piston 34 of a hydraulic mechanism 33 fixedly mounted on the base structure 1. As the piston 34 moves up and down, the sleeve 32 is moved up and down along the peripheral wall of the spindle 26 and the powder 28 is compressed within the cell casing 20 by the upward movement of the sleeve.

A stopper 35 is connected to the lower end of a spindle 72 of a hydraulic mechanism 37 fixedly mounted on a bracket 36 on the base structure 1, and is moved vertically by said spindle 72. In a lowered position, the stopper 35 contacts the upper face of the casing holder 16 and prevents the cell casing 20, being held in said container holder, from moving upward relative thereto when the spindle 26 and the sleeve 32 are moved upwardly to effect compression molding of the powder 28 within said cell container.

A rocking lever 38 in engagement with the cam 9 to be rocked thereby has one end of a drive shaft 39 connected with one end and has one end of a return spring 40 anchored to the other end thereof. The drive shaft 39 has a sector gear 41 mounted at the other end thereof, which sector gear is in meshing engagement with a gear 43 to drive the same. The gear 43 is integral with a hopper mounting plate 42. Reference numeral 44 designates a sleeve for supporting the shaft 39.

The hopper mounting plate 42 is a fan-shaped plate and carries a main hopper 45 thereon which is fixed to said plate 42 adjacent its arcuate edge. The lower end of the main hopper 45 is in communication with a powder charging hopper 46 provided therebelow. The powder charging hopper 46 has in the lower end of its wall a sealing ring 71 being urged downwardly by the biasing force of a spring 70. The arrangement is such that when the powder charging hopper 46 has been moved to a point immediately above the top opening of the cavity die 29, with the sealing ring 71 sliding on an arcuate plate 47 which is secured to the top end of said cavity die 29, the powder in the main hopper 45 is charged into the cavity die 29 through sad charging hopper 46. The hopper mounting plate 42 is supported on a shaft 48.

At the station (d), the casing accommodating the shaped mold c, powder is removed from the rotary member 13. Namely, the cell casing 20 in which the powder 28 has been molded at the preceding station (c) is pushed downward by an L-shaped pushing rod 52, connected to the top end 51 of a spindle 49, when said cell casing is located immediately c, a discharge chute 53, whereby the cell casing is removed from the holder 16 and dropped into said discharge chute. The spindle 49 is connected at its lower end with one end of a rocking lever 50 which is in engagement with the cam 7 to be rocked thereby, the other end of said rocking lever being connected with a spring 55 to effect return movement of said rocking lever. The spindle 49 is supported by a sleeve 54.

Now, details of the essential portion of the apparatus and the powder molding operation thereof will be explained. First of all, the cell casings 20 are supplied in the chute 23 with the open ends thereof facing downwardly as shown in FIG. 2. When each of the cell casings 20 abuts against the stopper 25, the rocking lever 19 is pivoted by the cam 6 to cause the spindle 18 to move upward, so that the top end 24 of said spindle moves into the hollow in said cell casing and inserts said cell casing into the through-hole 65 of the holder 16 mounted in the rotary member 13, which holder is at that time temporarily held immovably in alignment with the spindle 18. In order to facilitate the insertion of the casing 20 into the holder 16, a magnet 56 may be provided above the holder.

Figure 3:
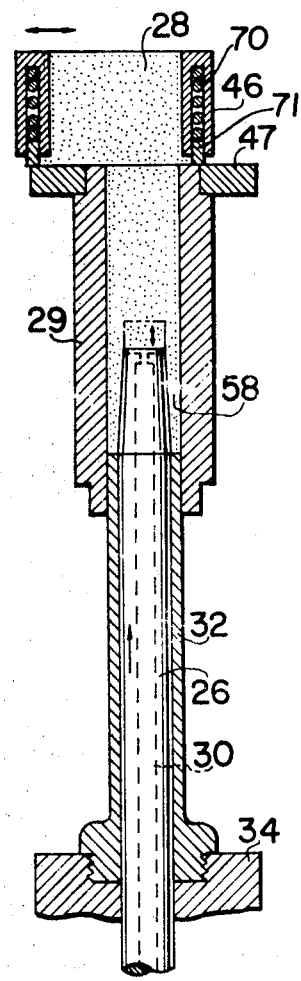
FIGS. 3 and 4 are views showing the step of charging the powder to be molded into a cavity die.
Figure 4:
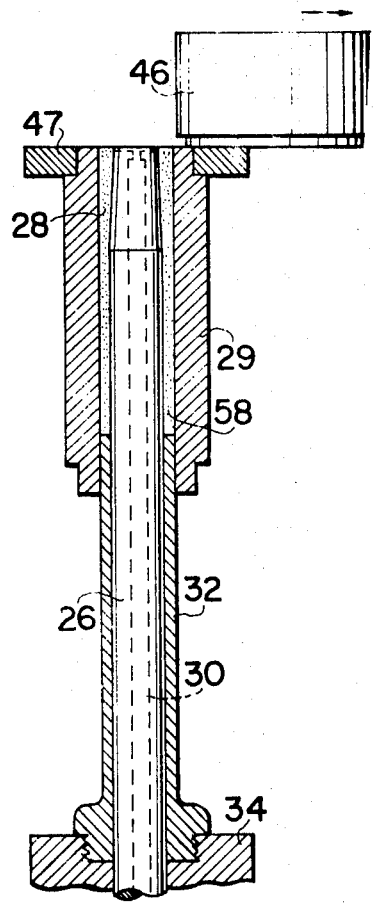

When the casing 20 has been carried to the station (c), the sector gear 41 mounted on the shaft 39 is rotated by the action of the cam 9, so that the hopper mounting plate 42 is rotated in a clockwise direction by the gear 43 meshing with said sector gear 41 and, therefore, the charging hopper 46 moves toward the station (c, with a mixed powder, e.g. a mixed powder of manganese dioxide and carbon, supplied therein from the main hopper 45, while sliding on the arcuate plate 47. When the charging hopper 46 has reached the station c, it is shaken to the left and right by the action of the cam 9 and the mixed powder in said hopper is charged into the cavity die 29 (FIG. 3). In this case, the spindle 26 is moved up and down over a short stroke by the action of the cam 8, whereby the mixed powder 28 is closely packed in the space 58 between the spindle 26 and the cavity die 29. Thereafter, the spindle 26 is further moved upward by the action of the cam 8 until the top end thereof is flush with the top face of the cavity die 29. Upon completion of the upward movement of the spindle 26, the charging hopper 46 is moved away from the station c, in a counterclockwise direction and returned to its original position (FIG. 4).

After the cavity die 29 has been filled with the mixed powder 28 and the charging hopper 46 has been moved away from the station c, the cell casing 20 is carried to the station c from the station b by the rotary member 13 and held immovably above said cavity die 29 in alignment therewith. In other words, the cell casing 20 mounted in the through-hole 65 of the holder 16 at the station a is brought to the station c through the station b, by two intermittent rotational movements of the rotary member 13, each through an angle of 90°, in a clockwise direction.

When the holder 16 is located immediately above the cavity die 29, with the cell casing 20 mounted therein, the hydraulic mechanism 37 mounted on the bracket 36 is actuated to move the piston 72 downward, so that the stopper 35 mounted to the lower end of said piston is brought into abutment against the bottom face of the casing 20 and the top face of the holder 16, whereby the holder 16 is pressed against the rotary member 13, compressing the rubber ring 15 therebetween. Thus, the cell casing 20 is rigidly held against movement (FIG. 5).

The core die-constituting spindle 26 is moved upward by the action of the cam 8 and the top end thereof abuts against the inner bottom face of the cell casing 20 being held by the holder 16. At the same time, the hydraulic mechanism 33 is actuated to move the piston 34 upward, so that the sleeve 32 is moved upward by said piston. Therefore, the mixed powder present in the space 58 is compressed while being forced slowly upwardly, and when the sleeve 32 has reached the end of its upward stroke, the entire mixed powder 28 is molded within the cell casing 20 under compression. In this case, the air present in the space 58 is discharged to the outside through a cross-shaped groove 61 formed in the top end face 60 of the spindle 26, an aperture 62 formed at the intersection of said cross-shaped groove and the axial bore 30 in the spindle 26, incident to the compression of the mixed powder 28. Therefore, in no cases are pores or cavities formed in the shaped mold of powder, formed within the cell casing 20, due to the presence of air.

In molding the mixed powder 28 within the cell casing 20, the top end portion 60 of the spindle 26 serves as a molding punch. Therefore, the mixed powder 28 is effectively compressed. It is also to be noted that the top end portion of the spindle 26 is tapered only slightly toward the end so as to facilitate removal of the spindle from the shaped mold upon completion of the molding.

Figure 9A:
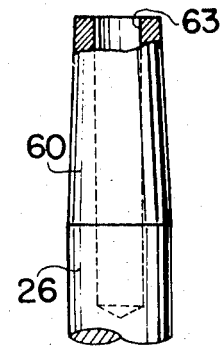
FIG. 9a is a front view showing the top end portion of another form of the core die-constituting spindle according to the present invention.
Figure 9B:
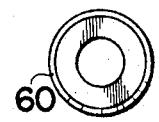

Instead of forming the axial bore 30 throughout the length of the spindle 26 as described above, a bottomed bore 63 may be formed axially in the spindle from the top face side thereof as shown in FIG. 9, for receiving therein the air which is purged in the molding of the powder 28 within the cell casing 20, and thereby absorbing the shock of the molding operation by the compressive force of air trapped in said bore. With such an arrangement, it is also possible to form a shaped mold of the powder 28 within the casing 20 which is free of pores or cavities.

Upon completion of the upward movement of the spindle 26 caused by the action of the cam 8 and the upward movement of the sleeve 32 by the operation of the hydraulic mechanism 33, said spindle and said sleeve are allowed to move downward to their original positions in the order mentioned so as to prevent collapse of the shaped mold 64, while the stopper 35 on the holder 16 is lifted upward by the operation of the hydraulic mechanism 37. Thus, the holder 16 is released from the upward and downward pressures, while holding the shaped mold of the powder 28 formed therein.

Thereafter, the rotary member 13 is rotated 90° in a clockwise direction to bring the cell casing to the station d and it is stopped in a position in which the through-hole 65 is aligned with the pushing rod 52 connected to the top end 51 of the spindle 49. The spindle 49 is pulled downward in this position of the through-hole 65 by the action of the cam 7, so that the pushing rod 52 is lowered into said through-hole 65 of the holder 16, depressing the bottom face of the cell casing 20, whereby said cell casing is moved out from the holder 16 and dropped into the chute 53 (FIG. 7).

Figure 10:
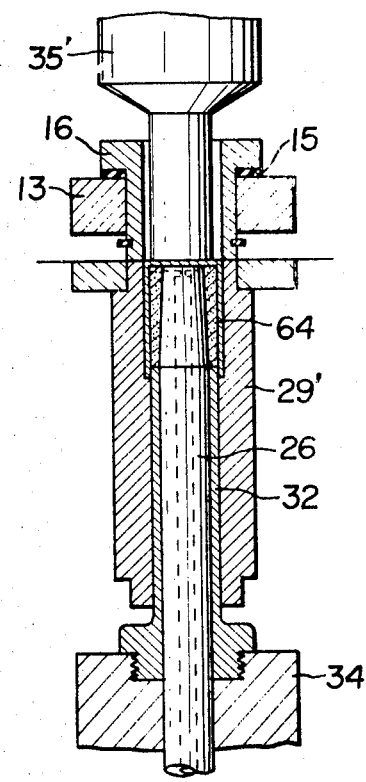
FIG. 10 is a front view showing the essential portion of another embodiment of the apparatus for compression molding a powder within a container according to the present invention, with a portion thereof broken away.
Figure 8A:
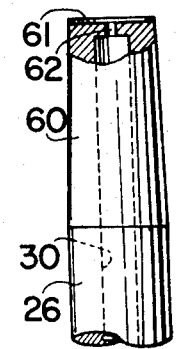
FIG. 8a is a front view showing the top end portion of a core die-constituting spindle.
Figure 8B:

THe foregoing description exemplifies a series of operations of forming a shaped mold 64 of the powder 28 within the cell casing 20 by compression molding. A modification of the above-described apparatus is shown in FIG. 10, in which the cell casing being carried by the rotary member 13 is forced by a pusher 35' into a cavity die 29' the cavity of which has previously been filled with the powder 28 in such a manner as stated above, while the sleeve 32 are moved upward within said cavity die, whereby the powder is compression-molded within the cell casing 20 to form a shaped mold 64, similar to that formed in the preceding embodiment, by the cooperation of said pusher, and said spindle and said sleeve, and thereafter the pusher 35' is moved upward and the spindle 26 is also moved further upward to insert the cell casing 20 accommodating the shaped mold of powder into the through-hole 65 in the rotary member 13 and is subsequently moved downward to permit the rotation of the rotary member.

According to the present invention, as described above, the powder is packed in the cell casing and compression-molded within said cell casing. Therefore, a strong bond is obtained between the casing and the shaped mold of the powder. Furthermore, the amount of powder charged in the cell casing is always constant and accordingly the density of the shaped mold is uniform, so that the internal resistance of the product cell, particularly the contact resistance between the shaped mold and the cell casing, can be reduced so low as to fall within the range from 0.2 to 0.3 ohm and an excellent discharge performance of the cell can be obtained. Still further, the cell casing need not be produced with high accuracy because the shaped mold of the powder can be formed in conformance with the shape of a given cell casing.

Another advantage of the present invention is that the drawbacks possessed by the conventional method, such as the occurrence of broken edges or cracks at the time of molding a powder or the occurrence of cracks in the shaped mold when inserting said shaped mold into a cell casing, can be entirely eliminated and furthermore, since the formation of the shaped mold and the insertion of the shaped mold into the cell casing can be effected simultaneously, the positive electrode elements for cells can be produced on the basis of mass production at a high efficiency.

The apparatus of the present invention which is excellent in respect of workability as well as performance as described above, can be applied to the production of cells in a wide range, by replacing the cell casing, mentioned in the embodiments herein, with a zinc casing for a dry cell or with a casing for a mercury cell and by replacing the powder with the depolarizing mixtures for the respective cells. The apparatus of the invention also finds a wide range of application, other than in the production of cells, wherever a powder is to be compression-molded within a container.

I claim:

1. An apparatus for effecting compression molding of a powder within a container, comprising a rotary member having at least three through-holes therein and adapted to be rotated while holding in each of said through-holes a container, open at one end, with the open end facing downwardly; means for rotating said rotary member intermittently in such a manner that each of said through-holes is located at at least three stations of said apparatus one after another successively; means provided at at least one of said stations and adapted to insert said container into said through-hole in the rotary member with the open end thereof facing downwardly when said through-hole is located at said at least one station; means provided at at least another one of said stations and comprising a hopper capable of reciprocatory movement in relation to rotation of said rotary member, a cavity die having formed therein a hollow open at the upper and lower ends thereof, and a core die capable of vertical reciprocatory movement within said cavity die, said last-mentioned means being operative in such a manner that when the lower open end of said cavity die has been closed by said core die, a compression-moldable powder is charged into the hollow of said cavity die from said hopper and after that when the container being held in said through-hole is located at said at least another one of the stations and held immovably thereat, said core die is moved upwardly in said cavity die, whereby said powder in said cavity die is packed into said container and compression-molded therein into a prescribed shape; and means provided at at least still another one of said stations and adapted to remove said container from said rotary member with the shaped mold of the powder therein when said container is located and held immovably at said still another one of the stations.

2. An apparatus for effecting compression molding of a powder within a container, comprising a cross-shaped rotatable rotary member having a container holder secured to the outer end of each arm thereof, said container holder having formed therein a through-hole adapted for holding a container, open at one end, with the open end facing downwardly; means for rotating said rotary member intermittently in such a manner that each of said through-holes is located at at least three stations of said apparatus one after another successively; means provided at at least one of said stations and comprising a container delivery chute and a vertically movable spindle which is moved upwardly when each of the containers being delivered in said container delivery chute with the open end facing downwardly is brought into alignment with said through-hole, whereby said container is inserted into said through-hole; means provided at at least another one of said stations and comprising a reciprocating hopper, a cavity die having formed therein a cylindrical hollow open at the upper and lower ends thereof, a core die-constituting spindle capable of vertical reciprocatory movement within said cavity die and a sleeve surrounding said spindle and being moved vertically reciprocatorily within said cavity die along the peripheral wall of said spindle, the lower open end of said cavity die being closed by said spindle and said sleeve and after a compression-moldable powder has been charged into the hollow of said cavity die from the hopper sliding on an arcuate plate secured at one end to said cavity die said spindle being moved upwardly and when the container being held in said through-hole has been located at said another one of the stations in alignment with the spindle and the sleeve said spindle and said sleeve being further moved upwardly, whereby said powder charged in said cavity die is packed into said container and compression-molded therein into a prescribed shape; a vertically movable stopper adapted to abut against the top face of said holder and the bottom face of said container being held in said holder when said container is located at said another one of stations and held immovably above said cavity die, and thereby to prevent said container from being pushed upwardly to move out of said holder during compression molding of said powder within said container; and means provided at at least still another one of said stations and adapted to push said container from the upper side when said container, with the shaped mold of the powder formed therein, is located at said still another one of the stations and thereby to remove said container from said holder.

3. An apparatus for effecting compression molding of a powder within a container, as defined in claim 2, in which said core die-constituting spindle has a gas exhaust bore formed therein penetrating from the top end to the bottom end thereof.

4. An apparatus for effecting compression molding of a powder within a container, comprising a rotary member having at least three through-holes therein and adapted to be rotated while holding in each of said through-holes a container, open at one end, with the open end facing downwardly; means for rotating said rotary member intermittently in such a manner that each of said through-holes is located at at least three stations of said apparatus one after another successively; means provided at at least one of said stations and adapted to insert said container into said through-hole in the rotary member with the open end thereof facing downwardly when said through-hole is located at said at least one station; means provided at at least another one of said stations and comprising a hopper capable of reciprocatory movement in relation to rotation of said rotary member, a cavity die having formed therein a hollow open at the upper and lower ends thereof, a core die capable of vertical reciprocatory movement within said cavity die and a vertically movable pusher, said last-mentioned means being operative in such a manner that when the lower open end of said cavity die has been closed by said core die, a compression-moldable powder is charged into the hollow of said cavity die from said hopper and after that when said container being held in said through-hole has been located at said at least another one of the stations and is held immovably thereat, said container is forced into said cavity die by said pusher, whereby said powder is received in and compression-molded within said container into a prescribed shape by the cooperation of said container and said core die moving upwardly within said container relative thereto, and thereafter said pusher is moved upwardly from said container and said core die is moved further upwardly to insert the container with the shaped mold of the powder formed therein into said through-hole in the rotary member and is subsequently moved downward to permit the rotation of the rotary member; and means provided at at least still another one of said stations and adapted to remove said container from said rotary member with the shaped mold of the powder therein when said container is located and held immovably at still another one of the stations.